March 31, 1942. H. B. NOBLE 2,277,880

LEVELING ATTACHMENT FOR TRACTORS

Filed April 12, 1940

Inventor:
Harley B. Noble,
by Sam J Slotky
Attorney.

Patented Mar. 31, 1942

2,277,880

UNITED STATES PATENT OFFICE 2,277,880

LEVELING ATTACHMENT FOR TRACTORS

Harley B. Noble, Washta, Iowa

Application April 12, 1940, Serial No. 329,355

6 Claims. (Cl. 97—47)

My invention relates to a leveling attachment for tractors.

An object of my invention is to provide means attachable to a standard tractor which means will level the ground surface which is normally caused to pack by virtue of the tractor tires passing over the same.

A further object of my invention is to provide such a feature which is resilient and which is adjustable.

A further object of my invention is to provide such attachments which can be raised from operating position to an inoperative position and which can be conveniently raised by the operator of the tractor.

A further object of my invention is to provide such an arrangement which will automatically raise both forward and rearward arrangements simultaneously through a common lever.

A further object of my invention is to provide a forward arrangement which is shock proof regardless of the angle of travel of the tractor.

A further object of my invention is to provide a simple and compact structure which will not get out of order and which can be manufactured at a reasonable cost.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1:
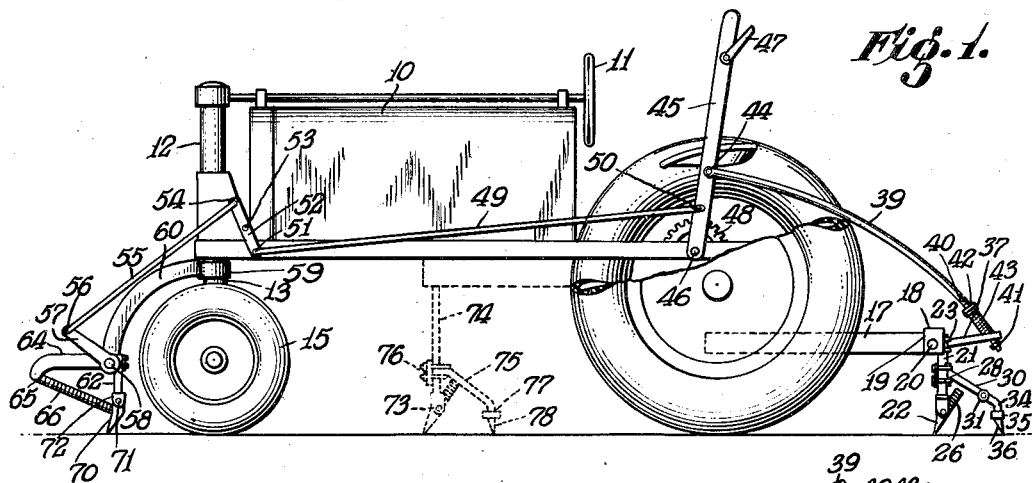
Figure 1 is a side elevation of a tractor employing my device.
Figure 2:
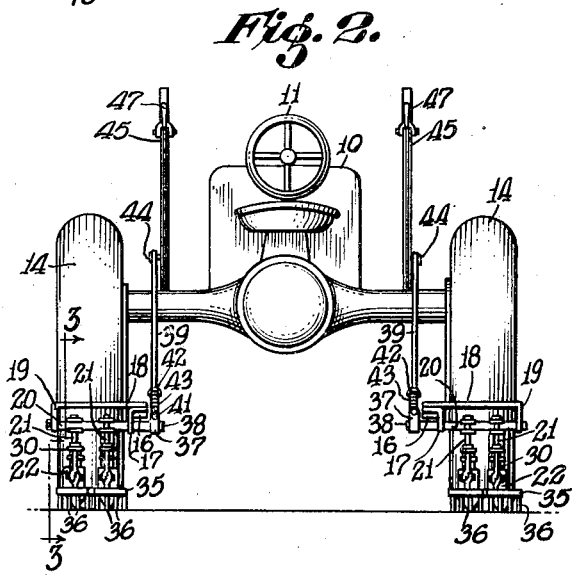
Figure 2 is a rear elevation of the same.

In using a tractor for cultivating or allied purposes, as the tractor travels across the field, the weight of the tractor upon the usual tires which usually are of the rubber tired variety, will cause a furrow to be impressed into the ground which is closely packed. As the tractor then travels tranversely of these furrows the tendency is for the entire tractor to be jolted and shaken due to the impacting action caused by the wheels traveling across the transverse paths. The principal function of my invention is to provide means which are attached to the tractor and which travel simultaneously with the same at the necessary positions for leveling these paths.

I have used the character 10 to designate the engine hood of a tractor, 11 the steering wheel, 12 the upper spindle housing and 13 the lower turning spindle. The large rear tires are indicated by the character 14 and the forward tires by the character 15 which tires are suitably mounted upon the usual wheels. The draw bar is removed from the tractor and attached to the side members 16 which normally support the draw bar are the rearwardly extending angle members 17. The angle members 17 which thus extend rearwardly at both sides have attached to them the transverse member 18 which terminates in the downwardly bent flange 19.

A shaft 20 is journalled in suitable openings within the members 17 and the flange 19 as shown. Attached to the shaft 20 are a pair of shanks 21 which shanks are attached to suitable standard shovel members 22. The shanks 21 can be attached by means of the U bolts 23 which pass through a keep plate 24 which is secured by means of the nuts 25. The shovel member 22 is of a standard construction and includes a spring arrangement at 26 for tripping over obstacles and the like. Attached to the upright spindle is a bracket 27 which is attached by means of further U bolts 28 and the keep plate 29 and the usual nuts.

The bracket 27 extends into the downwardly extending arm 30 which is attached to the toothed flange 31 which flange 31 in turn engages a further flange 32 which is also toothed and a nut and bolt arrangement 33 passes through the flanges 31 and 32. The member 32 extends into the further arm 34 which is attached to a transverse member 35. Attached to the member 35 are a series of equally spaced rearwardly sloping teeth 36. A pair of arms 37 are attached at 38 to the inner ends of the shafts 20. Received within the opening 38a at the outer extremity of the arms 37 are the arcuate rods 39.

The rod 39 is threaded as at 40 and a nut 41 is solidly pinned or locked to the extremity of the rod 39. A further nut 42 and a lock nut 43a are threadably engaged upon the threaded portion 40 and received upon the rods 39 between the nut 42 and the outer end of the arms 37 are the helical compression springs 43. The rods 39 are substantially arcuate and pass upwardly and are pivoted at 44 to the levers 45 which levers are pivoted at 46 to the frame of the tractor and include suitable hand controls 47 which engage with the notched arrangement 48 as in standard practise. A forwardly extending rod 49 is pivoted at 50 to one lever 45. The rod 49 is pivoted at 51 to an arm 52 which is pivoted centrally thereof at 53 to the tractor frame.

Figure 4:
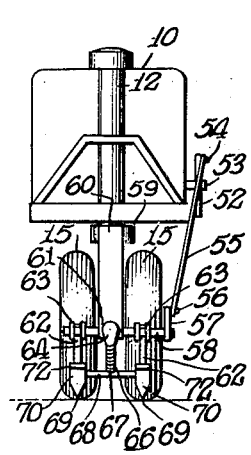
Figure 4 is a forward elevation.

The upper end of the arm 52 is pivoted at 54 to a further rod 55 which is pivoted at 56 to a forward arm 57. The arm 57 is attached at the end of the shaft 58 (see Figures 1 and 4). Attached solidly to the stationary portion of the spindle 13 at 59 is a forwardly and downwardly extending rigid arm 60. The shaft 58 is journalled at 61 within the lower extremity of the arm 60 and extends on either side of the journalling point. Suitably attached to the transverse shaft 58 are the forward shanks 62 which are attached by means of U bolts 63 and in a manner similar to the shank shown in the rear construction. The arm 60 extends into a continuation 64 which is attached at 65 to the tension spring 66. The spring 66 is attached at 67 to the cross rod 68 which is solidly attached at 69 to a pair of forward shovels 70. The shovels 70 are pivoted at 71 adjacent the shoulder 72 so that the shovel will be locked against movement forwardly but can be released rearwardly.

It should be noted that the members 49, 55, etc., are located only on one side of the tractor and are operated only by one lever 45. This arrangement, then, provides for lifting of both forward shovels through one lever only. However, the use of both levers will permit selective use of either rearward arrangement. This will not interfere with the proper functioning of the attachments since both forward shovels should operate at the same time regardless of which rear arrangement is being used.

Now that the structure of my device has been explained I shall explain the operation thereof.

When the levers 45 are pushed forwardly, the rod 39 will be thrust forwardly, thereby bringing the nut 41 upwardly and raising the arms 37 which swing the shovels upwardly and out of engagement with the ground. At the same time, the rod 49 is thrust forwardly and toward the arm 52 which causes the member 55 to be drawn inwardly thereby swinging the arms 57 rearwardly and drawing the forward shovels out of engagement. When the levers 45 are pulled rearwardly, however, the rod 39 will be thrust rearwardly which will cause the nut 42 to compress against the spring 43 thereby carrying the arm 37 downwardly and swinging the shovels 22 and the teeth 36 into engagement with the ground.

At the same time, the rod 49 is pulled rearwardly which thereby forces the rod 55 forwardly through the reverse action in the arm 52 which in turn causes the arm 57 to be carried forwardly bringing the shovels 70 into contact with the ground. The levers 45 are then locked in position and the device is ready for operation and during forward motion of the tractor the shovel points of the shovels 70 and 22 will disintegrate the hard packed surfaces caused by the tires and the surface will be then completely leveled out by means of the teeth 36 so that the aforementioned objections caused by the hard packing of the tires will be remedied.

The forward shovels perform the same functions and the spring 66 provides for a release of the shovels if the tractor is passing downwardly in a slight ditch or hits other obstacles and the pivoting arrangement at 71 will permit rearward movement in case of striking of such obstacles and will allow release of the shovel for any purpose or for any impediment other than normally caused by resistance to the earth. The spring pressure of the spring 43 against the nut 42 and the end of the arm 37 tends to maintain an evenly balanced pressure against the shovel 22 due to the compression of this spring and the usual spring arrangement 26 permits individual tripping of the shovels for harder obstacles etc. The flanges 31 and 32 provide for adjustment of the teeth 36 to any depth which adjustment will be necessary in many instances.

An extra feature of my device is that shown in Figure 1 in which one of the cultivator shovels such as 73 is shown attached to the spindle 74. It will be understood that there are several of such cultivator shovels attached to the tractor in the usual manner which have not been shown herein in order to make the explanation and drawing clearer. However, the larger shovels 73 which would tend to form a deep path can be leveled by a similar arrangement as provided rearwardly and this will include a further rearwardly extending rod 75 which is bolted at 76 to the upright portion 74.

The rod 75 is attached rearwardly to the member 77 which is attached to further teeth 78. This then will provide a complete leveling attachment for all of the portions of the machine which would tend to leave hard packed paths or deeper grooves and the like.

Figure 3:
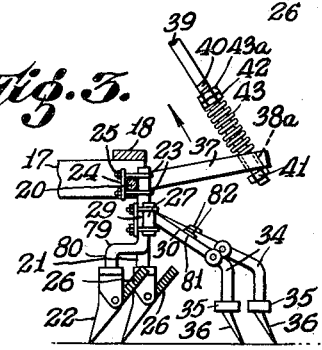
Figure 3 is an enlarged detail taken generally along the lines 3—3 of Figure 2, and showing a modified form.
Figure 5:
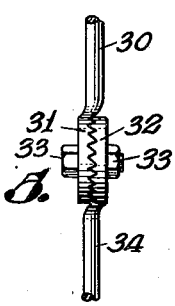
Figure 5 is a detail.

Although the arrangement of the shovels 22 and the teeth 36 can be used as shown in Figure 1 nevertheless, the modification shown in Figure 3 will be generally preferred for the reasons about to be described.

In the modification shown in Figure 3, the vertical shanks 21 at the outer portions of the shaft 20 can be formed including the horizontal portion 79 which again bends downwardly into the vertical portion 80 which is attached to the shovel 22. The spindle 21 at the inner portion of the shaft 20 will continue downwardly in the manner as in Figure 1 and as shown in Figure 3. Correspondingly, the rearwardly extending brackets 30 will be staggered in the same manner with one bracket or arm 30 attached to the outer bent spindle 21 being positioned inwardly toward the tractor and a further arm 30 which is attached to the inner spindle 21 being positioned further away and rearwardly from the tractor.

This offset arrangement provides for a better leveling or shoveling effect since the staggered arrangement causes a more uniform passage through the dirt and distributes the same more evenly through this staggered arrangement due to the partial side cutting effect. The arms 30 can be split at 81 and the leaf springs 82 are riveted suitably to the arms and straddling these split portions. The reason for these springs is to provide a resilient effect to the arms 30 in case the teeth 36 strike a harder obstacle and the like.

It will now be seen that I have provided a device which can be attached to a tractor, which levels the ground surface which is normally caused to pack and that I provide such features which are resilient and adjustable. It will also be seen that I have provided means for lowering such means to operative position or for raising the same to inoperative position. It will also be seen that I have provided shock proof arrangements and that I have provided a simple structure.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A leveling attachment for tractors comprising shovels pivotally attached rearwardly of tractor wheels, means for pivoting the same to inoperative position, including a shaft attached to said shovels, an arm attached to said shaft, a hand lever pivotally attached to a tractor frame, a rod attached to said arm and said lever, a further member attached rearwardly of said shovels, pointed members attached to said member for breaking up the ground surface behind said shovels.

2. A leveling attachment for tractors comprising shovels pivotally attached rearwardly of tractor wheels, means for pivoting the same to inoperative position, including a shaft attached to said shovels, an arm attached to said shaft, a hand lever pivotally attached to a tractor frame, a rod attached to said arm and said lever, a further member attached rearwardly of said shovels, pointed members attached to said member for breaking up the ground surface behind said shovels, means for adjustably securing said rearward pointed members to desired level.

3. A leveling attachment for tractors comprising shovels pivotally attached rearwardly of tractor wheels, means for pivoting the same to inoperative position, including a shaft attached to said shovels, an arm attached to said shaft, a hand lever pivotally attached to a tractor frame, a rod attached to said arm and said lever, a further member attached to said arm and said lever, a further member attached rearwardly of said shovels, pointed members attached to said member for breaking up the ground surface behind said shovels, means for adjustably securing said rearward pointed members to desired level, a forwardly extending rod attached to one of said hand levers, an arm pivotally attached to said rod, said arm being pivotally secured to the tractor at the midpoint thereof, a further rod pivotally attached to the upper end of said arm, a lower arm pivotally attached to the extreme end of said further rod, a shaft attached to said lower arm, a pair of shovels attached to said shaft and positioned forwardly of the tractor forward wheels.

4. A leveling attachment for tractors comprising shovels pivotally attached rearwardly of tractor wheels, means for pivoting the same to inoperative position, including a shaft attached to said shovels, an arm attached to said shaft, a hand lever pivotally attached to a tractor frame, a rod attached to said arm and said lever, a further member attached to said arm and said lever, a further member attached rearwardly of said shovels, pointed members attached to said member for breaking up the ground surface behind said shovels, means for adjustably securing said rearward pointed members to desired level, a forwardly extending rod attached to one of said hand levers, an arm pivotally attached to said rod, said arm being pivotally secured to the tractor at the midpoint thereof, a further rod pivotally attached to the extreme end of said further rod, a shaft attached to said lower arm, a pair of shovels attached to said shaft and positioned forwardly of the tractor forward wheels, a brace member attached to the forward spindle housing of the tractor and receiving said shaft, said brace member having an integral forward extension, a tension spring attached to said forward extension and to said forward shovels.

5. A leveling attachment for tractors comprising shovels pivotally attached rearwardly of tractor wheels, means for pivoting the same to inoperative position, including a shaft attached to said shovels, an arm attached to said shaft, a hand lever pivotally attached to a tractor frame, a rod attached to said arm and said lever, a further member attached to said arm and said lever, a further member attached rearwardly of said shovels, pointed members attached to said member for breaking up the ground surface behind said shovels, means for adjustably securing said rearward pointed members to desired level, a forwardly extending rod attached to one of said hand levers, an arm pivotally attached to said rod, said arm being pivotally secured to the tractor at the midpoint thereof, a further rod pivotally attached to the extreme end of said further rod, a shaft attached to said lower arm, a pair of shovels attached to said shaft and positioned forwardly of the tractor forward wheels, a brace member attached to the forward spindle housing of the tractor and receiving said shaft, said brace member having an integral forward extension, a tension spring attached to said forward extension and to said forward shovels, said forward shovels being pivoted and including stop means to limit forward movement of the shovels and to provide rearward release of the same.

6. A leveling attachment for tractors comprising shovels pivotally attached rearwardly of tractor wheels, means for pivoting the same to inoperative position, including a shaft attached to said shovels, an arm attached to said shaft, a hand lever pivotally attached to a tractor frame, a rod attached to said arm and said lever, a further member attached to said arm and said lever, a further member attached rearwardly of said shovels, pointed members attached to said member for breaking up the ground surface behind said shovels, means for adjustably securing said rearward pointed members to desired level, a forwardly extending rod attached to one of said hand levers, an arm pivotally attached to said rod, said arm being pivotally secured to the tractor at the midpoint thereof, a further rod pivotally attached to the extreme end of said further rod, a shaft attached to said lower arm, a pair of shovels attached to said shaft and positioned forwardly of the tractor forward wheels, a brace member attached to the forward spindle housing of the tractor and receiving said shaft, said brace member having an integral forward extension, a tension spring attached to said forward extension and to said forward shovels, said forward shovels being pivoted and including stop means to limit forward movement of the shovels and to provide rearward release of the same, toothed members attached rearwardly of the cultivator shovels attached to said tractor.

HARLEY B. NOBLE.